(12) United States Patent
Chen et al.

(10) Patent No.: US 11,072,137 B2
(45) Date of Patent: Jul. 27, 2021

(54) METHODS OF FORMING CONTACT LENSES TO REDUCE THE TRANSMITTANCE OF LIGHT

(71) Applicant: ClearVision Sciences, Inc., Hayward, CA (US)

(72) Inventors: Charlie Chen, San Ramon, CA (US); Tahua Yang, Woodridge, IL (US)

(73) Assignee: ARGOS VISION INC., Chicago, IL (US)

(*) Notice: Subject to any disclaimer, the term of this patent is extended or adjusted under 35 U.S.C. 154(b) by 262 days.

(21) Appl. No.: 16/160,917

(22) Filed: Oct. 15, 2018

(65) Prior Publication Data
US 2020/0114603 A1 Apr. 16, 2020

(51) Int. Cl.
| | | |
|---|---|---|
| *B29D 11/00* | (2006.01) | |
| *G02C 7/10* | (2006.01) | |
| *G02C 7/04* | (2006.01) | |
| *B29K 105/00* | (2006.01) | |
| *B29K 33/00* | (2006.01) | |

(52) U.S. Cl.
CPC .. *B29D 11/00913* (2013.01); *B29D 11/00038* (2013.01); *G02C 7/04* (2013.01); *G02C 7/108* (2013.01); *B29K 2033/08* (2013.01); *B29K 2105/0032* (2013.01); *B29K 2823/12* (2013.01)

(58) Field of Classification Search
CPC ........ B29D 11/00913; B29D 11/00038; G02C 7/108; G02C 7/04; B29K 2105/0032; B29K 2823/12; B29K 2033/08
See application file for complete search history.

(56) References Cited

U.S. PATENT DOCUMENTS

| | | | |
|---|---|---|---|
| 4,252,421 A | 2/1981 | Foley, Jr. | |
| 4,458,229 A | 7/1984 | Landry | |
| 4,468,229 A | 8/1984 | Su | |
| 4,733,959 A | 3/1988 | Clausen | |
| 4,891,046 A | 1/1990 | Wittmann et al. | |
| 4,898,695 A * | 2/1990 | Doshi .............. | B29D 11/00903 264/2.6 |
| 5,534,038 A | 7/1996 | Evans | |
| 5,617,154 A | 4/1997 | Hoffman | |

(Continued)

FOREIGN PATENT DOCUMENTS

| | | |
|---|---|---|
| CN | 106033150 A | 10/2016 |
| TW | I511871 B | 12/2015 |

(Continued)

OTHER PUBLICATIONS

International Search Report and Written Opinion issued for International Application No. PCT/US2019/055082 dated Jan. 23, 2020, 11 pages.

*Primary Examiner* — Mathieu D Vargot
(74) *Attorney, Agent, or Firm* — Klintworth & Rozenblat IP LLP

(57) ABSTRACT

A method of preparing and using a contact lens is disclosed. In one step, a light-absorbing dye solution, comprising a light-absorbing dye disposed in a solution, is dispensed onto a contact lens. In another step, the light-absorbing dye is reacted with the contact lens so that the contact lens permanently contains the light-absorbing dye. The transmission of light of a certain wavelength through the contact lens is reduced due to the reacted light-absorbing dye permanently contained within the contact lens.

27 Claims, 3 Drawing Sheets

(56) References Cited

U.S. PATENT DOCUMENTS

| | | |
|---|---|---|
| 6,305,801 B1 | 10/2001 | Kerns |
| 7,364,291 B2 | 4/2008 | Haywood |
| 7,368,072 B2 | 5/2008 | Gemert |
| 9,904,074 B2 | 2/2018 | Duis |
| 2014/0327869 A1* | 11/2014 | Renzi ................ C08G 18/3865 351/44 |
| 2015/0338681 A1* | 11/2015 | Liu .................. B29D 11/00903 351/159.31 |
| 2016/0136847 A1 | 5/2016 | Goodenough et al. |
| 2018/0059436 A1 | 3/2018 | Muya et al. |

FOREIGN PATENT DOCUMENTS

| | | |
|---|---|---|
| WO | 2012082710 A1 | 6/2012 |
| WO | 2016175619 A1 | 3/2016 |

\* cited by examiner

| RY86 Concentration, % | T%(420-450nm) |
|---|---|
| 0 | 95.1 |
| 0.03 | 88.9 |
| 0.1 | 76 |
| 0.6 | 20.6 |

METHODS OF FORMING CONTACT LENSES TO REDUCE THE TRANSMITTANCE OF LIGHT

FIELD OF THE DISCLOSURE

This disclosure relates to methods of forming contact lens with light-absorbing dyes to reduce the transmittance of light through the contact lenses.

BACKGROUND

Light, when transmitted into human eyes, may cause physiological issues causing discomfort or vision issues. For instance, certain forms of light have been implicated in the development of Age-Related Macular Degeneration. Additional forms of light have been implicated in the trigger of migraines. Other forms of light, if reduced, have been shown to improve color perception of color-blindness. Additional forms of light have been implicated in the development of photophobia. Still other forms of light have been implicated in causing other types of issues and/or to improve conditions if reduced.

Methods of reducing the transmission of certain forms of light into human eyes is needed to decrease or eliminate these medical issues.

SUMMARY

In one embodiment, a method of preparing and using a contact lens is disclosed. In one step, a light-absorbing dye solution, comprising a light-absorbing dye disposed in a solution, is dispensed onto a contact lens. In another step, the light-absorbing dye is reacted with the contact lens so that the contact lens permanently contains the light-absorbing dye. As the result, the transmission of light of a certain wavelengths through the contact lens is reduced due to the reacted light-absorbing dye permanently contained within the contact lens.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
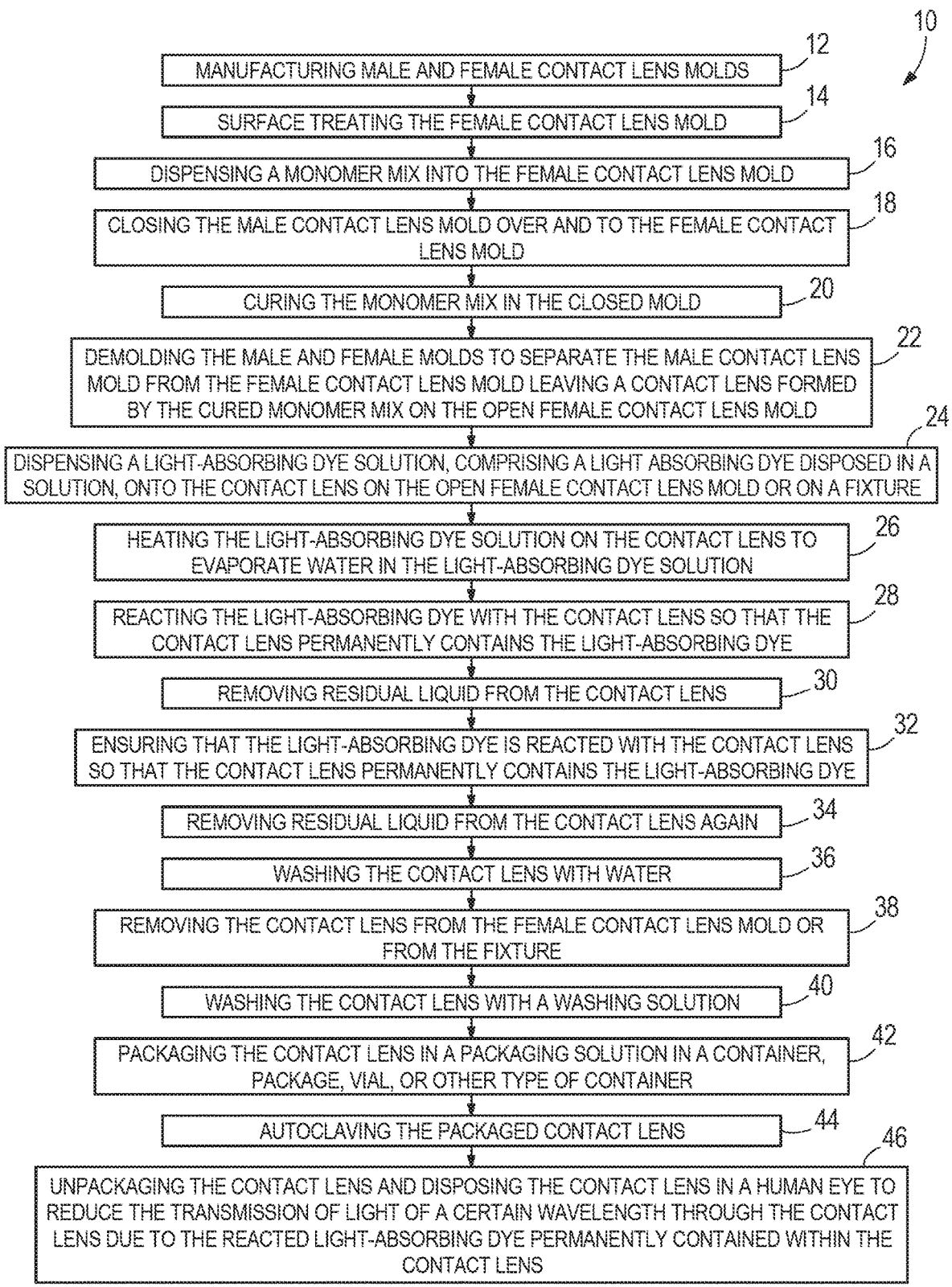
FIG. 1 is a flowchart illustrating one embodiment of a method of preparing and using a contact lens.

FIG. 1 is a flowchart illustrating one embodiment of a method 10 of preparing and using a contact lens. The method 10 may be used to form any type of contact lens including dry or wet contact lens comprising Hydroxyethyl Methacrylate (HEMA) soft contact lenses, silicone soft contact lenses, rigid hard contact lenses, or other types of contact lenses. Step 12 comprises manufacturing male and female contact lens molds. The male and female contact lens molds may be molded (such as through injection molding), machined, or manufactured using other methods. The male and female contact lens molds may be made from a variety of materials such as homo-polymers or copolymers including Polypropylene, Ethylene vinyl alcohol, Polybutylene Terephthalate, Polystyrene, and Nylon. The male and female contact lens molds may be dimensionally stable within two hours after manufacture for shrinkage consistency. Nucleating agents may be used to speed up the molding process. In other embodiments, the male and female contact lens molds may be manufactured using varying methods, systems, and methods.

Step 14 comprises surface treating the female contact lens mold. The surface treatment may be used so that in later steps a contact lens will stay on the surface treated portion of the female contact lens mold when the mold is demolded (opened). The surface treatment may comprise plasma (air or oxygen), corona, flame, chemical, or wet chemistry with a contact angle less than 60 degrees. In other embodiments, the surface treatment may vary. In still other embodiments, rather than use a surface treatment in step 14, the male contact lens mold may be heated so that in later steps a contact lens will stay on the female contact lens mold when the mold is opened. In still other embodiments, rather than use a surface treatment in step 14, a retention structure of either the female contact lens mold or the male contact lens mold may be present so that in later steps a contact lens will stay in place on the female contact lens mold when the mold is demolded. In still other embodiments, rather than use a surface treatment in step 14, varying methods or structures may be used or present so that in later steps a contact lens will stay in place on the female contact lens mold when the mold is opened.

Step 16 comprises dispensing a liquid monomer mix into the female contact lens mold. The monomer mix may comprise polymerizable methacrylate or vinyl compounds such as Hydroxyethyl Methacrylate, may be Silicone-based, may be Fluorosilicone-based, or may comprise other materials, such as initiator, tint, UV absorber, or diluent. Step 18 comprises closing the male contact lens mold over and to the female contact lens mold. Step 20 comprises curing the monomer mix in the closed mold. The curing may take place by ultraviolet, radiation, heat, or other curing processes. Step 22 comprises demolding the male and female molds to separate the male contact lens mold from the female contact lens mold leaving a contact lens formed by the cured monomer mix on the open female contact lens mold.

Preferably the contact lens is left on the open female contact lens mold and steps 24 through 36 below take place while the contact lens is disposed on the open female contact lens mold. Alternatively, in another embodiment the contact lens may be removed from the open female contact lens mold immediately after or during step 22 and the removed contact lens may then be placed onto a fixture which holds the contact lens. Steps 24 through 36 below may then take place with the contact lens disposed on the fixture rather than on the open female contact lens mold.

Step 24 comprises dispensing a light-absorbing dye solution, comprising a light-absorbing dye disposed in a solution, onto the contact lens. This may take place on the open female contact lens mold, or on a fixture as discussed above.

The light-absorbing dye may be colored and may comprise Reactive Yellow 86, Reactive Yellow 15, Reactive Black 5, Reactive Orange 78, Reactive Blue 6, Reactive Red 11, Reactive Red 180, or a combination thereof. In other embodiments, the light-absorbing dye may comprise varying light-absorbing dyes. In one embodiment, step 24 may comprise covering a center portion of the contact lens with the light-absorbing dye solution and not covering an outer portion of the contact lens, disposed outside of the center portion of the contact lens, with the light-absorbing dye. In one embodiment the center portion of the contact lens may comprise a diameter in a range of three to thirteen mm, but preferably the center portion comprises a diameter in a range of five to eight mm. In one embodiment, the center portion may comprise less than or equal to the size of a human iris so that the light-absorbing dye, which may be colored, does not extend into the white sclera of the human eye for aesthetic reasons to avoid an unnatural appearance of the eye. In other embodiments, the center portion of the contact lens may vary in size.

Step 26 comprises heating the light-absorbing dye solution on the contact lens to evaporate water in the light-absorbing dye solution. This may occur while the contact lens is disposed in the female contact lens mold or on the fixture as discussed above. In one embodiment, the heating may be done at 70 degrees Celsius for 30 minutes. In another embodiment, the heating may be done in a range of 60-90 Celsius for a range of 10-60 minutes. In another embodiment, the heating may be done at varying temperatures for varying durations. Step 28 comprises reacting the light-absorbing dye with the contact lens so that the contact lens permanently contains the light-absorbing dye. This may occur while the contact lens is disposed in the female contact lens mold or on the fixture as discussed above. In one embodiment, step 28 may comprise adding a substance to the light-absorbing dye on the contact lens to cause the light-absorbing dye to react with the contact lens, simultaneously or subsequently heating the light-absorbing dye on the contact lens to accelerate the reaction, and the light-absorbing dye soaking through a cross-section of the contact lens. The light-absorbing dye may react with a hydroxyl group of the contact lens. In other embodiments, the light-absorbing dye may react with various materials of the contact lens. The substance may comprise an alkaline solution having a pH in a range of eight to twelve. In other embodiments, the substance may comprise any substance which causes the light-absorbing dye to react with the contact lens. The heating may take place at 70 degrees Celsius for a period of 20 minutes. In another embodiment, the heating may be done in a range of 40-90 Celsius for a range of 10-60 minutes. In another embodiment, the heating may be done at varying temperatures for varying durations. In other embodiments, the heating may take place at varying temperatures for varying durations.

Step 30 comprises removing residual liquid from the contact lens. This may occur while the contact lens is disposed in the female contact lens mold or on the fixture as discussed above. In one embodiment, the residual liquid may be removed using a pipetting system. In other embodiments, the residual liquid may be removed using varying liquid removal systems or methods.

Step 32 comprises ensuring that the light-absorbing dye is reacted with the contact lens so that the contact lens permanently contains the light-absorbing dye. This may occur while the contact lens is disposed in the female contact lens mold or on the fixture as discussed above. In one embodiment, step 32 may comprise adding the substance to the light-absorbing dye on the contact lens again to cause the light-absorbing dye to react with the contact lens, simultaneously or subsequently heating the light-absorbing dye on the contact lens to accelerate the reaction, and the light-absorbing dye soaking through a cross-section of the contact lens. The light-absorbing dye may react with a hydroxyl group of the contact lens. In other embodiments, the light-absorbing dye may react with various materials of the contact lens. The substance may comprise an alkaline solution having a pH in a range of eight to twelve. In other embodiments, the substance may comprise any substance which causes the light-absorbing dye to react with the contact lens. The heating may take place at 70 degrees Celsius for a period of 20 minutes. In another embodiment, the heating may be done in a range of 40-90 Celsius for a range of 10-60 minutes. In another embodiment, the heating may be done at varying temperatures for varying durations.

Step 34 comprises removing residual liquid from the contact lens again. This may occur while the contact lens is disposed in the female contact lens mold or on the fixture as discussed above. In one embodiment, the residual liquid may be removed using a pipetting system. In other embodiments, the residual liquid may be removed using varying liquid removal systems or methods.

Step 36 comprises washing the contact lens with water. This may occur while the contact lens is disposed in the female contact lens mold or on the fixture as discussed above. In one embodiment, the washing may take place while the contact lens is heated at 70 degrees Celsius for 10 minutes. In another embodiment, the washing may take place while the lens is heated in a range of 40-90 Celsius for a range of 10-30 minutes. In another embodiment, the washing may take place while the lens is heated at varying temperatures for varying durations.

Step 38 comprises removing the contact lens from the female contact lens mold or from the fixture as discussed above. In one embodiment, the contact lens may be removed from the female contact lens mold or from the fixture by floating the contact lens off in water or in a water/isopropyl alcohol solution. In other embodiments, the contact lens may be removed from the female contact lens mold or from the fixture through other systems or methods. Step 40 comprises washing the contact lens with a washing solution. The washing solution may comprise a water/alcohol solution or a phosphate-buffered saline solution. In other embodiments, the contact lens may be washed with different types of washing solutions.

Step 42 comprises packaging the contact lens in a packaging solution in a container. The packaging solution may comprise a buffer saline solution. In other embodiments, the packaging solution may comprise varying types of packaging solutions. The container may comprise a blister package, vial, or other type of container. Step 44 comprises autoclaving the packaged contact lens.

Step 46 comprises unpackaging the contact lens and disposing the contact lens in a human eye to reduce the transmission of light of a certain wavelength through the contact lens due to the reacted light-absorbing dye permanently contained within the contact lens. The certain wavelength may comprise a wavelength in a range of 400-450 nm which corresponds to blue-violet light which has been implicated in the development of Age-Related Macular Degeneration in medical research. In another embodiment, the certain wavelength may comprise a wavelength in a range of 480-500 nm which has been implicated to have an effect on migraines. In still another embodiment, the certain wavelength may comprise a wavelength in a range of 545-575 nm which can be reduced and has been shown to improve color perception due to color-blindness. In other embodiments, the certain wavelength may comprise varying wavelength ranges which may correspond to various medical or physiological conditions.

Due to the contact lens permanently containing the reacted light-absorbing dye, the transmission of the light of the certain wavelength through the contact lens may be reduced to less than ninety percent of the transmission of the light of the certain wavelength which would have been transmitted through the contact lens if the contact lens did not contain the reacted light-absorbing dye. As a result, the physiological condition implicated by the certain wavelength may be reduced or eliminated due to wearing of the contact lens. In other embodiments, the reacted light-absorbing dye may reduce the transmission of the light of the certain wavelength through the contact lens by eighty percent, seventy percent, sixty percent, fifty percent, forty percent, thirty percent, twenty percent, ten percent, zero percent, or by varying amounts.

Due to the light-absorbing dye, which may be colored, being confined to the center portion of the contact lens, which is equal to or less than the size of the human's iris, and the light-absorbing dye not being disposed within the outer portion of the contact lens, which is disposed over the human's pupil, the contact lens results in a natural appearance of the eye.

The method 10 may generate less than 2 milliliters colored liquid waste per contact lens produced by the method, due to the using up and evaporating of the light-absorbing dye solution, which reduces environmental concerns while reducing the costly amount of colored liquid waste which has to be disposed of per government regulations. In other embodiments, the method may generate varying amounts of colored liquid waste per contact lens produced by the method.

In other embodiments, one or more steps of the method 10 may not be followed, one or more steps of the method 10 may be altered in order or in substance, or one or more additional steps may be added to the method 10 in varying orders.

For instance in another embodiment of the method 10, the light-absorbing dye solution dispensed onto the contact lens in step 24 may cause a reaction with the contact lens so that the contact lens permanently contains the light-absorbing dye without having to add the substance to cause the reaction. In this embodiment, the light-absorbing dye may undergo a light reaction which causes the light-absorbing dye to become insoluble in water, an oxidizing reaction which causes the light-absorbing dye to become insoluble in water, or another type of reaction which causes the light-absorbing dye to become insoluble in water. The light-absorbing dye may comprise a class of soluble Vat dye comprising Vat Blue 1, Vat Blue 6, Vat Green 1, Vat Brown 1, Orange 1, a combination thereof, or may further vary. In this embodiment, the heating of the light-absorbing dye on the contact lens in step 26 may accelerate the reaction. Steps 28-34 may then be eliminated since the substance is not needed to cause the reaction, and the method 10 may proceed directly from step 26 to step 36. All other steps of the method 10 may be identical to those described in the embodiment of FIG. 1.

The methods of the disclosure were tested with proven results. In one test for blue-light blocking, Polymacon HEMA contact lens were tinted with RY86 (Reactive Yellow 86). RY86 is soluble in water up to 3%. Concentrations of 0.03%, 0.1%, and 0.6% of RY86 in water were prepared to test on separate contact lenses against a control contact lens having no RY86. Polypropylene (PP) molds, each comprising male and female contact lens molds, were used to form dry contact lenses using the methods of the disclosure. The majority of the contact lenses (greater than ninety percent) stayed in the female parts of the contact lens molds. 80 µl of the above-mentioned concentrations of the RY86 solution were then added onto separate respective concave portions of the dry contact lenses on the female contact lens molds to wet only the center portions of the contact lenses. The female contact lens molds containing the separate contact lenses having the above-mentioned differing concentrations of RY86 were placed in an oven at 70 degrees Celsius for 30 minutes, and then the liquid was fully evaporated from the dry contact lenses. 100 µl of 0.5% $K_2CO_3$ solution (pH 11) was added into the contact lenses on the female contact lens molds and then the contact lenses were heated at 70 degrees Celsius for 20 minutes. The small amount of remaining RY 86 was pipetted out of the contact lenses. 400 µl of 0.5% $K_2CO_3$ solution was then added into the contact lenses and heating was continued at 70 degrees Celsius for 30 minutes. The $K_2CO_3$ solution was then pipetted out of the contact lenses, 0.5 ml of distilled water was added into each contact lens, and the contact lenses were heated for another 10 minutes at 70 degrees Celsius. The contact lenses were then floated off the contact lens molds. The contact lenses were then each transferred into vials containing two ml of phosphate-buffer-solution having a pH of 7.4 and were then heated at 80 degrees Celsius for 1 hour. The contact lenses were yellow at their center portions and no dye was found to leach into the liquid. The contact lenses were then autoclaved for storage.

The contact lenses were analyzed and tested using the following procedure. The ultra-violet visible spectrum was measured from the center portions of the contact lenses using a Beckman DU530 ultra-violet visible Scanning Spectrophotometer. A range of 200-800 nm wavelength was scanned, using distilled water as a baseline. The center portions (or optical zones) of the contact lenses were on the light path in the spectrophotometer, so that only the optical zones were measured. An average transmittance of light between a wavelength range of 420-450 nm of the center portions of the contact lenses were calculated as an indication of the extent of blue light blocking. The distortion and dye uniformity of the contact lenses were observed visually.

Figures 2, 3:
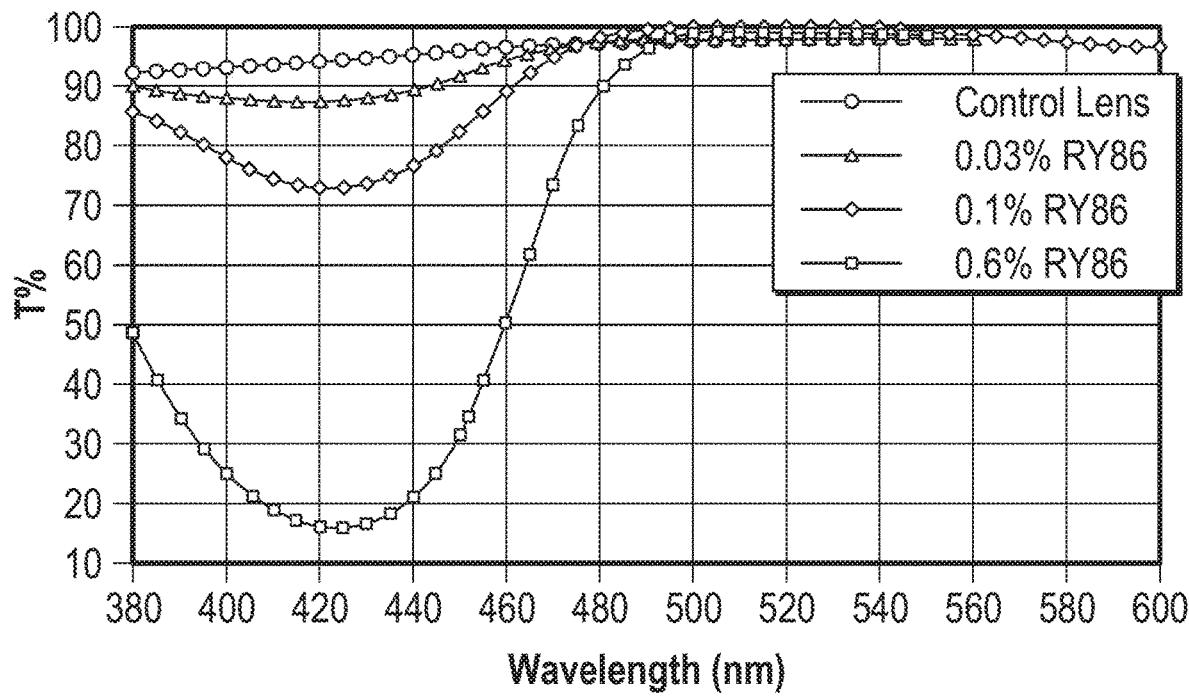
FIG. 2 illustrates a plot showing the ultra-violet visible transmittance of a control contact lens having no RY86 concentration and the ultra-violet visible transmittance of contact lenses treated with respective 0.03%, 0.1%, and 0.6% concentrations of RY86.
FIG. 3 illustrates a table showing the average transmittance of the contact lenses of FIG. 2 in a wavelength range of 420-450 nm.

The diameter of each contact lens was around 14.2 mm. The diameters of the yellow tinted center portions of the contact lenses were around 7-8 mm, comparable to 8 mm of optical zones for human eyes. FIG. 2 illustrates a plot showing the ultra-violet visible transmittance of a control contact lens having no RY86 concentration and the ultra-violet visible transmittance of the respective contact lenses treated with the 0.03%, 0.1%, and 0.6% concentrations of RY86. FIG. 3 illustrates a table showing the average transmittance of the contact lenses of FIG. 2 in a wavelength range of 420-450 nm. As shown from the data, the transmittance in the blue light range of 420-450 nm decreases as the RY86 concentration increases, indicating that absorbance of blue light in this range increases as RY86 concentration increases. In other words, the transmittance of the contact lenses can be controlled by adjusting the concentration of the dye concentration at the dye soaking stage.

The treated contact lenses retained non-distorted shapes during wet processing and after being autoclaved. The yellow-tinted center portions of the contact lenses were very uniform, showing no particles or any noticeable defects after being autoclaved. No dye leaches into the buffer solutions was observed after storing in buffer saline solutions for over a month.

In another test, a Silicone Hydrogel (SiHy) contact lens, Clariti 1 Day, was selected to be treated with a yellow dye using a similar method as used for the Polymacon contact lenses described above. The contact lens contained HEMA monomer in its formulation as indicated in public USAN information, which reacts with RY86 during dying reaction. The tinting procedure was as follows. The commercial contact lens was taken out of its blister and briefly washed in distilled water. The contact lens was air dried for 20 minutes followed by drying at 75° C. for 10 minutes. The dry contact lens was placed in a concave portion of a Polypropylene female mold, and then 60 μl of 0.2% RY86 solution were added into the dry contact lens. The mold was placed into a 75° C. oven, and the liquid was dried out of the contact lens in 14 minutes. 75 ul of 0.5% $K_2CO_3$ solution was added into the contact lens and the mold was then placed in a 75° C. oven for 15 minutes until the contact lens was dry. 200 μl of $K_2CO_3$ solution was added into the contact lens. The mold was then heated at 75° C. for 10 minutes. The contact lens was then transferred into distilled water and heated at 90° C. for 1 hour. The contact lens was then transferred to a phosphate-buffer-solution having a pH of 7.4, and then heated at 90° C. for 30 minutes. The contact lens was then cooled down to measure the ultraviolet-visible spectrum.

Figure 4:
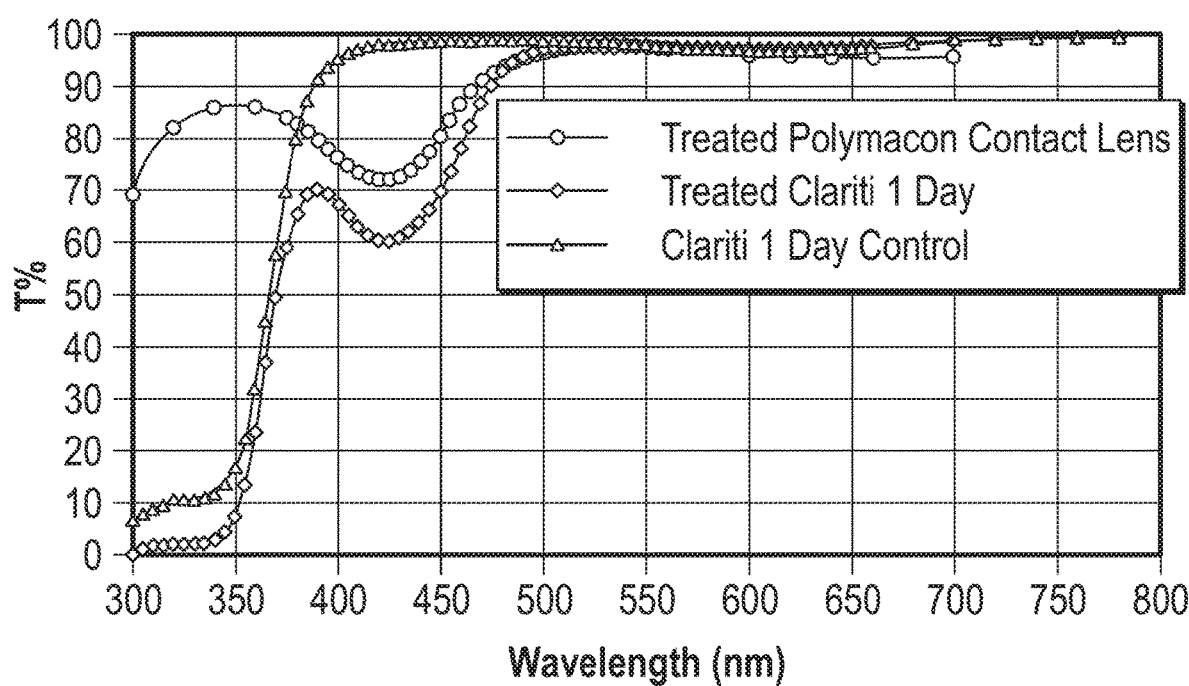
FIG. 4 illustrates a plot showing the ultraviolet-visible transmittance of a center portion of a treated Clariti 1 Day contact lens compared to a Clariti 1 Day Control contact lens having no RY86 solution and to a Polymacon contact lens having a tinted center portion.

The contact lens had no obvious distortion, with a center portion having a diameter of about 8 mm which was yellow-tinted. The average transmission of light having a wavelength in a range of 420-450 nm was measured to be 63.1%. FIG. 4 illustrates a plot showing the ultraviolet-visible transmittance of the center portion of the treated Clariti 1 Day contact lens compared to a Clariti 1 Day Control contact lens having no RY86 solution and to a Polymacon contact lens having a tinted center portion. As seen from the plot, the Clariti 1 Day Control contact lens had a very low transmission of light at a wavelength in a range of 300-380 nm as it contained ultraviolet blocker in its formulation. The HEMA-based treated Polymacon contact lens did not contain an ultraviolet blocker and thus had a much higher transmission of light at a wavelength in a range of 300-380 nm. The treated Clariti 1 Day contact lens had a low transmission of light at a wavelength in a range of 400-450 nm demonstrating how treating this contact lens with the methods of the disclosure reduced the transmission of light in this wavelength range.

The methods of the disclosure allow for naturally looking contact lens to be formed, while producing minimal colored liquid waste, which when inserted into human eyes block certain harmful wavelengths of light or block certain wavelengths of light which result in improved vision during activities such as sporting activities. Moreover, since the light-absorbing dye is reacted into and throughout a cross-section of the contact lens the risk of the light-absorbing dye leaching into the ocular space of the eye is eliminated thereby making the contact lens safe to be worn.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A method of preparing and using a contact lens comprising:
dispensing a monomer mix in a female contact lens mold;
then closing the female contact lens mold with a male contact lens mold;
then forming a contact lens in the female contact lens mold by curing the monomer mix in the female contact lens mold with the male contact lens mold closed against the female contact lens mold to shape the contact lens disposed between the female and male contact lens molds;
then separating the male contact lens mold from the female contact lens mold to leave the contact lens on the female contact lens mold;
then dispensing a light-absorbing dye solution, comprising a light-absorbing dye disposed in a solution, directly onto the contact lens disposed on the female contact lens mold;
then reacting the light-absorbing dye with the contact lens disposed on the female contact lens mold so that the contact lens permanently contains the light-absorbing dye; and
reducing the transmission of light of a certain wavelength through the contact lens due to the reacted light-absorbing dye permanently contained within the contact lens.

2. The method of claim 1 wherein the dispensing the light-absorbing dye solution directly onto the contact lens disposed on the female contact lens mold comprises covering a center portion of the contact lens with the light-absorbing dye solution and not covering an outer portion of the contact lens, disposed outside of the center portion of the contact lens, with the light-absorbing dye solution.

3. The method of claim 2 wherein the center portion of the contact lens comprises a diameter in a range of three mm to thirteen mm.

4. The method of claim 3 further comprising heating the reacted light-absorbing dye directly on the contact lens disposed on the female contact lens mold to evaporate water in the light-absorbing dye, and, as a result of the heating and evaporation, the method generating less than two milliliters of colored liquid waste for the contact lens disposed on the female contact lens mold.

5. The method of claim 1 wherein the reacting the light-absorbing dye with the contact lens disposed on the female contact lens mold comprises reacting the light-absorbing dye with a hydroxyl group of the contact lens disposed on the female contact lens mold so that the contact lens permanently contains the light-absorbing dye.

6. The method of claim 1 wherein the reacting the light-absorbing dye with the contact lens disposed on the female contact lens mold comprises adding a substance to the light-absorbing dye on the contact lens disposed on the female contact lens mold to cause the light-absorbing dye to react with the contact lens disposed on the female contact lens mold.

7. The method of claim 6 wherein the substance comprises an alkaline solution having a pH in a range of eight to twelve.

8. The method of claim 1 wherein the reacting the light-absorbing dye with the contact lens disposed on the female contact lens mold comprises heating the light-absorbing dye directly on the contact lens disposed on the female contact lens mold to accelerate the reaction.

9. The method of claim 1 wherein the light-absorbing dye comprises Reactive Yellow 86, Reactive Yellow 15, Reactive Black 5, Reactive Orange 78, Reactive Blue 6, or Reactive Red 11, Reactive Red 180 or a combination thereof.

10. The method of claim 1 wherein the reducing the transmission of the light of the certain wavelength through the contact lens due to the reacted light-absorbing dye permanently contained within the contact lens comprises reducing the transmission of the light of the certain wavelength to less than ninety percent.

11. The method of claim 1 wherein the reacting the light-absorbing dye with the contact lens disposed on the female contact lens mold so that the contact lens permanently contains the light-absorbing dye comprises the light-absorbing dye undergoing a light or oxidizing reaction so that the contact lens permanently contains the light-absorbing dye.

12. The method of claim 1 wherein the light-absorbing dye comprises a Vat dye.

13. The method of claim 12 wherein the Vat dye comprises Vat Blue 1, Vat Blue 6, Vat Green 1, Vat Brown 1, Vat Orange 1, or a combination thereof.

14. The method of claim 11 wherein the light or the oxidizing reaction causes the light-absorbing dye to become insoluble in water.

15. The method of claim 14 wherein the reacting the light-absorbing dye with the contact lens disposed on the female contact lens mold comprises heating the light-absorbing dye directly on the contact lens disposed on the female contact lens mold to accelerate the reaction.

16. The method of claim 1 wherein the reacting the light-absorbing dye with the contact lens disposed on the female contact lens mold comprises the light-absorbing dye soaking through a cross-section of the contact lens disposed on the female contact lens mold.

17. The method of claim 1 further comprising heating the light-absorbing dye solution directly on the contact lens disposed on the female contact lens mold to evaporate water in the light-absorbing dye.

18. The method of claim 1 further comprising causing the contact lens to stay on the female contact lens mold when the male contact lens mold is separated from the female contact lens mold by: surface treating the female contact lens mold before dispensing the monomer mix in the female contact lens mold; heating the male contact lens mold; or using a retention structure of either the female contact lens mold or the male contact lens mold.

19. The method of claim 18 further comprising heating the light-absorbing dye solution directly on the contact lens on the female contact lens mold to evaporate water from the light-absorbing dye.

20. The method of claim 19 further comprising, after evaporating the water from the light-absorbing dye solution, adding an alkaline solution, with a pH in a range of eight to twelve, to the light-absorbing dye on the contact lens on the female contact lens mold to cause the light-absorbing dye to react with the contact lens.

21. The method of claim 20 further comprising heating the light-absorbing dye as it reacts with the contact lens on the female contact lens mold to accelerate the reaction.

22. The method of claim 21 further comprising, after reacting the light-absorbing dye with the contact lens on the female contact lens mold, removing residual liquid from the contact lens on the female contact lens mold.

23. The method of claim 22 further comprising, after removing the residual liquid from the contact lens on the female contact lens mold, adding water to the contact lens on the female contact lens mold and washing the contact lens while heating the contact lens directly on the female contact lens mold.

24. The method of claim 23 further comprising, after washing the contact lens, removing the contact lens from the female contact lens mold.

25. The method of claim 24 further comprising, after removing the contact lens from the female contact lens mold, washing the contact lens with a water/alcohol solution.

26. The method of claim 25 further comprising, after washing the contact lens with the water/alcohol solution, packaging the contact lens in a buffer saline solution and autoclaving the packaged contact lens.

27. The method of claim 1 further comprising heating the reacted light-absorbing dye directly on the contact lens disposed on the female contact lens mold to evaporate water in the light-absorbing dye, and, as a result of the heating and evaporation, the method generating less than two milliliters of colored liquid waste for the contact lens disposed on the female contact lens mold.

* * * * *